(12) United States Patent
Sarraf

(10) Patent No.: US 7,072,592 B2
(45) Date of Patent: Jul. 4, 2006

(54) DIFFERENTIAL DENSE WAVELENGTH DIVISION MULTIPLEXING (DDWDM) IN OPTICAL SYSTEMS

(75) Inventor: Mohsen Sarraf, Rumson, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 352 days.

(21) Appl. No.: 09/681,720

(22) Filed: May 25, 2001

(65) Prior Publication Data

US 2002/0176132 A1   Nov. 28, 2002

(51) Int. Cl.
*H04J 14/02* (2006.01)
*H04B 10/06* (2006.01)

(52) U.S. Cl. .................. 398/208; 398/81; 398/91; 398/192

(58) Field of Classification Search ............... 398/208, 398/91, 81, 79, 185, 192, 183
See application file for complete search history.

(56) References Cited

FOREIGN PATENT DOCUMENTS

| EP | 0 449 474 A | 10/1991 |
|---|---|---|
| FR | 2 537 364 A1 | 6/1984 |
| FR | 2 563 672 A | 10/1985 |

*Primary Examiner*—Leslie Pascal

(57) ABSTRACT

An apparatus provides an optical wavelength division multiplexed signal having 2M optical channels such that each of M information-bearing signals are differentially encoded onto 2 of the 2M optical channels. In particular, the apparatus comprises M inverters, 2M electrical-to-optical converters and a multiplexer. Each electrical-to-optical converter provides an optical signal at a different one of 2M wavelengths. The apparatus receives the M information-bearing signals and (a) creates M optical signals, each at a different wavelength, by converting each of the M information bearing signals into the optical domain via M of the 2M electrical-to-optical converters, and (b) creates M inverted optical signals, each at a different wavelength, by first inverting each of the M information bearing signals (via the M inverters) before conversion into the optical domain via the remaining M electrical-to-optical converters. The M optical signals along with the M inverted optical signals are then applied to the multiplexer, which provides an optical wavelength division multiplexed (WDM) signal having 2M channels.

6 Claims, 5 Drawing Sheets

DIFFERENTIAL DENSE WAVELENGTH DIVISION MULTIPLEXING (DDWDM) IN OPTICAL SYSTEMS

BACKGROUND OF INVENTION

This invention relates generally to communications and, more particularly, to optical communications systems.

In an optical communications system that utilizes dense wavelength division multiplexing (DWDM), a DWDM signal is created by multiplexing several sequences (or streams) of information bits, e.g., M streams, on M different optical wavelengths (or channels). For example, a DWDM signal may be created by modulating each laser of an M laser array with an associated one of the M information streams and combining the M laser array output signals, where each laser produces light at a different wavelength. Thus, each stream of information is conveyed via a separate optical channel (i.e., by an optical signal having a particular wavelength).

Unfortunately, this mapping of an information stream to a particular wavelength has some drawbacks. For example, if a laser fails the associated information stream is lost. Also, different wavelengths and therefore, different information streams may encounter different levels of impairments (e.g., signal strength degradation and spreading) on the transmission channel between a source node and a destination node. Thus, because of these impairments, one or more signal amplification and/or regeneration stages may be required depending on the distance between the source node and the destination node. This will of course add cost to the system.

SUMMARY OF INVENTION

In accordance with the invention, M information-bearing signals are processed for providing an optical wavelength division multiplexed signal having (N)(M) channels such that each information bearing signal is associated with a different N channels, where N is greater than or equal to two.

In an illustrative embodiment, an apparatus provides an optical wavelength division multiplexed signal having (N=2)M optical channels such that each of M information-bearing signals are differentially encoded onto 2 of the 2M optical channels. In particular, the apparatus comprises M inverters, 2M electrical-to-optical converters and a multiplexer. Each electrical-to-optical converter provides an optical signal at a different one of 2M wavelengths. The apparatus receives the M information-bearing signals and (a) creates M optical signals, each at a different wavelength, by converting each of the M information bearing signals into the optical domain via M of the 2M electrical-to-optical converters, and (b) creates M inverted optical signals, each at a different wavelength, by first inverting each of the M information bearing signals (via the M inverters) before conversion into the optical domain via the remaining M electrical-to-optical converters. The M optical signals along with the M inverted optical signals are then applied to the multiplexer, which provides an optical wavelength division multiplexed (WDM) signal having 2M channels. Thus, the information conveyed by each of M information-bearing signals is now transmitted on two different optical wavelengths, one carrying the information bits and the other carrying the inverted information.

DETAILED DESCRIPTION

Figure 1:
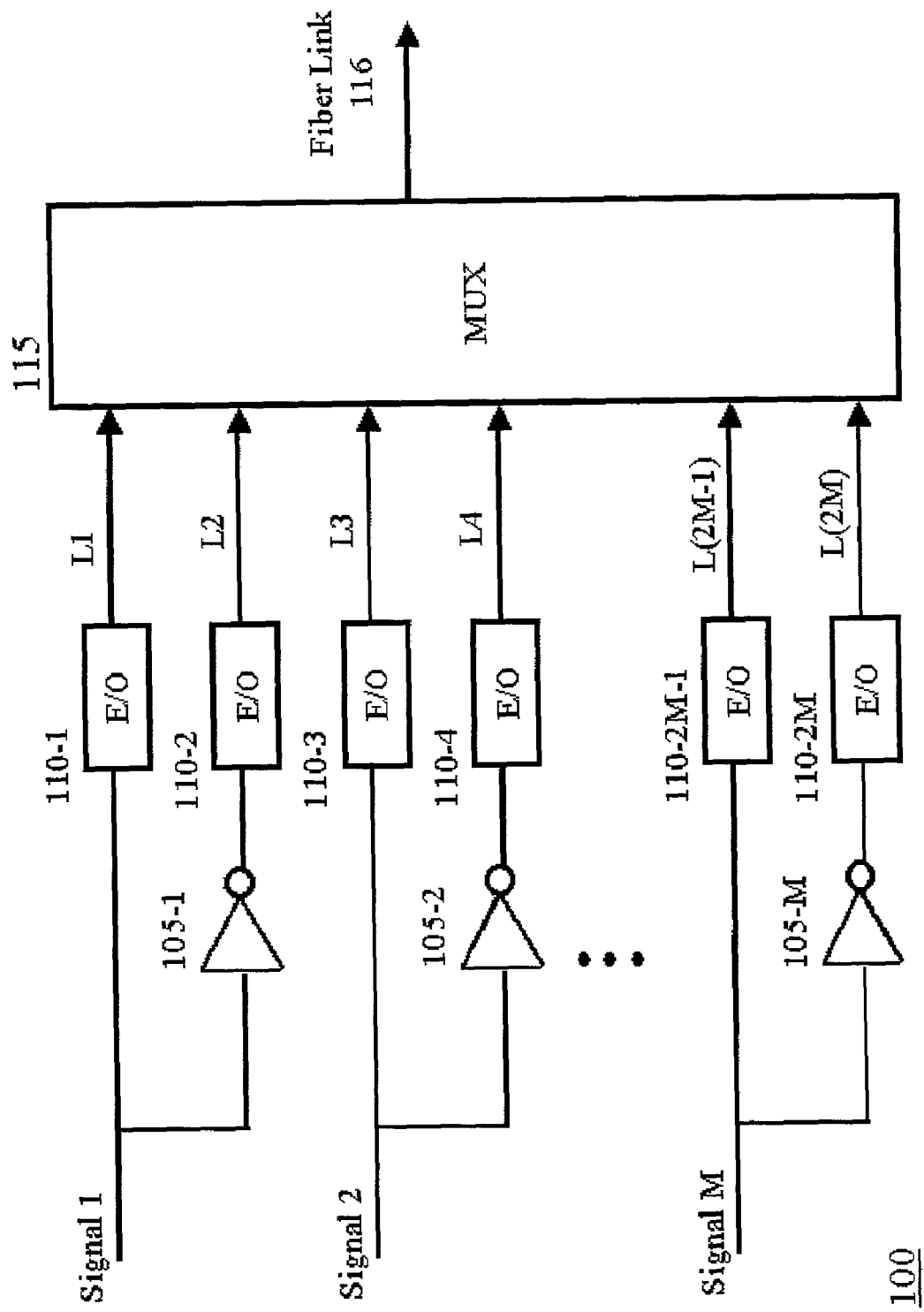
FIG. 1 shows an illustrative transmitting apparatus embodying the principles of the invention.

A portion of an illustrative apparatus, 100, in accordance with the principles of the invention is shown in FIG. 1. Other than the inventive concept, the elements shown in FIG. 1 are well-known and will not be described in detail. For example, mux 115 is a dense wavelength division multiplexer, and electrical-optical element 110-1 is an electrical to optical converter, as known in the art. In addition, although shown as single block elements, some or all of these elements may be implemented using stored-program-control processors, memory, and/or appropriate interface cards (not shown). It should be noted that the term node as used herein refers to any communications equipment, illustrations of which are routers, gateways, etc.

Apparatus 100 comprises M inverters (105-1 through 105-M), 2M electrical-to-optical (E/O) converters (110-1 through 110-2M) and a multiplexer (mux) 115. Each E/O converter provides an optical signal at a different one of 2M wavelengths. Each inverter simply inverts the electrical signal applied thereto. Apparatus 100 receives M information-bearing signals (in electrical form) as represented by signal 1 through signal M. (It should be noted that the location of the sources for these signals is irrelevant to the inventive concept. For example, some, or all, of these signals could be generated within apparatus 100, or by another element, which may, or may not, be part of a network (both not shown in FIG. 1).) It is assumed that each signal illustratively represents a pulse-amplitude modulated (PAM) signal wherein predefined voltage levels represent either a binary digit (bit) having a ONE value or a ZERO value. (However, the inventive concept is not so limited.) Apparatus 100 performs the following functions: (a) creates M optical signals, (b) creates M inverted optical signals, and (c) multiplexes the M optical signal and the M inverted optical signals to provide a multiplexed optical signal comprising 2M channels for transmission over fiber link 116. For example, consider the representative processing of signal 1 by apparatus 100. Signal 1 is applied to E/O 110-1 and inverter 105-1. E/O 110-1 converts signal 1 from the electrical domain to the optical domain and provides an optical signal having a wavelength L1 (also referred to herein as channel L1). Inverter 105-1 inverts signal 1 (e.g., changes bits having a value of ONE to ZERO and vice versa) and applies the inverted signal to E/O 110-2, which provides an inverted optical signal on a channel L2. Mux 115 receives the optical signals on channels L1 and L2 along with the other M-2 optical channels and provides an output signal, e.g., a wavelength division multiplexed (WDM) signal comprising 2M optical channels for transmission via fiber link 116 over a network (not shown).

As can be observed from FIG. 1, apparatus 100 provides for the synthesis of what is referred to herein as a differential WDM signal. In this example, every pair of channels carry opposite bits. For example, both channels L1 and L2 convey information relating to the same signal (here signal 1)—the non-inverted signal conveyed via channel L1 and the inverted signal conveyed via channel L2. As used herein, the two channels (or wavelengths) carrying information relating to the same signal are referred to as a wavelength pair, or channel pair. Since PAM modulation is illustratively used (i.e., no line coding is used), a ONE is represented by the presence of light during a bit time on an optical channel (i.e., light above a predefined intensity level) while a ZERO is represented by the lack of light during a bit time on the optical channel (light below a predefined intensity level). Since a channel pair is used to convey information relating to the same signal—a corresponding receiver (described below) uses the difference in light intensity between the optical signals conveyed on each channel pair each bit time for decoding the received signal. In other words, the receiver decodes the received signal by detecting which channel of the channel pair carries a higher intensity light signal—hence the terminology differential WDM. Consequently, there is no need for the receiver to use a fixed threshold detector for detecting ONEs and ZEROES.

An optical transmission system, e.g., using a form of PAM, may also be affected by, what is known in the art as, Inter-Symbol Interference (ISI). For example, when a ONE is followed by a ZERO (assuming that a ONE value is represented by the presence of light having intensity above a predefined level), the signal associated with the ONE may not have completely faded away when the corresponding receiver begins the detection process for the ZERO. However, and in accordance with the invention, the above-described differential WDM further reduces the affect of ISI. In particular, the receiver (described below) now uses the difference in light intensity between a channel pair for detecting the presence of a ONE or a ZERO. Thus, when a dark symbol (e.g., a ZERO) follows a light symbol (e.g., a ONE) on one channel of the channel pair—the reverse takes place on the other channel of the channel pair and the light intensity difference remains intact, resulting in less ISI.

Figure 2:
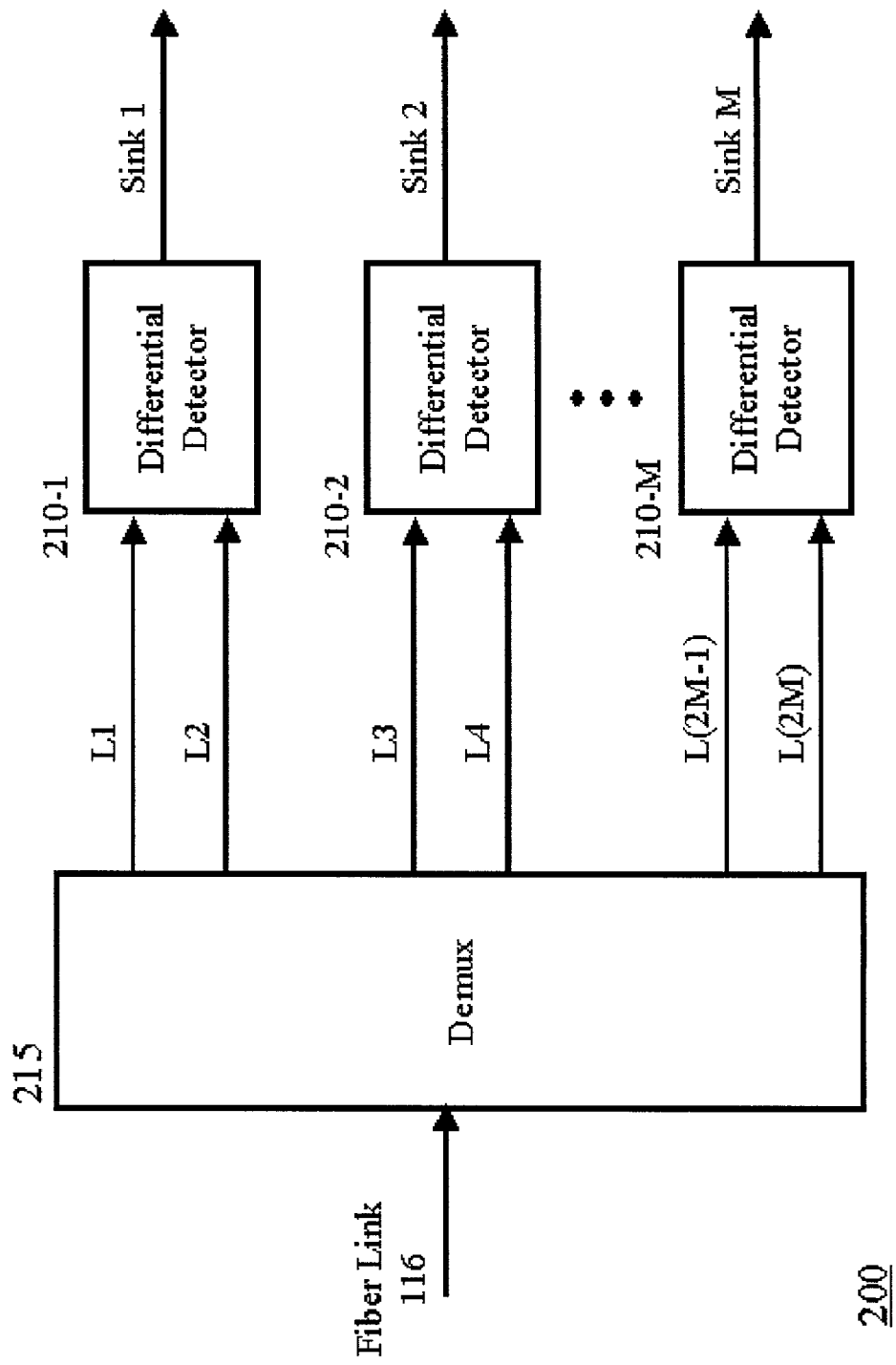
FIG. 2 shows an illustrative receiver apparatus in accordance with the principles of the invention.

A differential WDM receiver, 200, in accordance with the inventive concept is shown in FIG. 2. Other than the inventive concept, the elements shown in FIG. 2 are well known and will not be described in detail. WDM receiver 200 comprises demuxltiplexer (demux) 215, and M differential detectors (210-1 through 210-M). Demux 215 receives a WDM signal comprising 2M optical channels from fiber link 116 and provides 2M optical signals on channels L1, L2, L3, L4 . . . L(2M−1) and L (2M). As can be observed from FIG. 2, the 2M optical channels are processed in groups of two, or pairs, by a corresponding one of the differential detectors. For example, channels L1 and L2 are processed by differential detector 210-1. The latter performs—in effect—differential demodulation since, as noted above, the differential detector makes a decision as to a received bit value being a ONE or a ZERO by using the difference in light intensity between a channel pair. For example, each differential detector a priori associates one channel of the channel pair with a ONE, the other with a ZERO. By comparing which channel has more light intensity a ZERO or ONE is selected. Each differential detector provides a sink signal, which is a PAM electrical representation of the information stream (i.e., each differential detector also provides for a conversion from the optical domain to the electrical domain). WDM receiver 200 provides M output signals as represented by signals sink 1 through sink M.

It should be noted that present WDM receivers typically utilize a fixed threshold per wavelength. As such, one is more at the mercy of channel impairments and signal degradation. For example, as the signal level falls due to increased fiber length, it is more likely to make errors due to a lower margin against the threshold. Also, since different wavelengths might suffer with different degrees of channel impairments, threshold adjustments are required per wavelength and in some cases are not straight forward. However, in accordance with the invention, and as described above, in a differential mode there is no need for fixed thresholds since the differential detector detects which channel, of the channel pair, is stronger. As a result of this fact, the relative signal strength between the wavelength pair remains more intact. In other words, if the first wavelength had a stronger signal than the second one in the pair, then as they degrade the first one will stay stronger as far as the signal is not in the noise level. So, it takes a lot more degradation to make the relative signal strengths in a pair of wavelengths undetectable or falsely detected than if one was trying to find the presence of the signal above or below a fixed threshold. With this increased margin, the inventive concept allows an optical signal to travel farther for a given level of degradation. Consequently, the inventive concept provides for better detection at lower signal strengths—thus, providing the ability to transmit farther with the same signal strength when compared to present systems.

Figure 3:
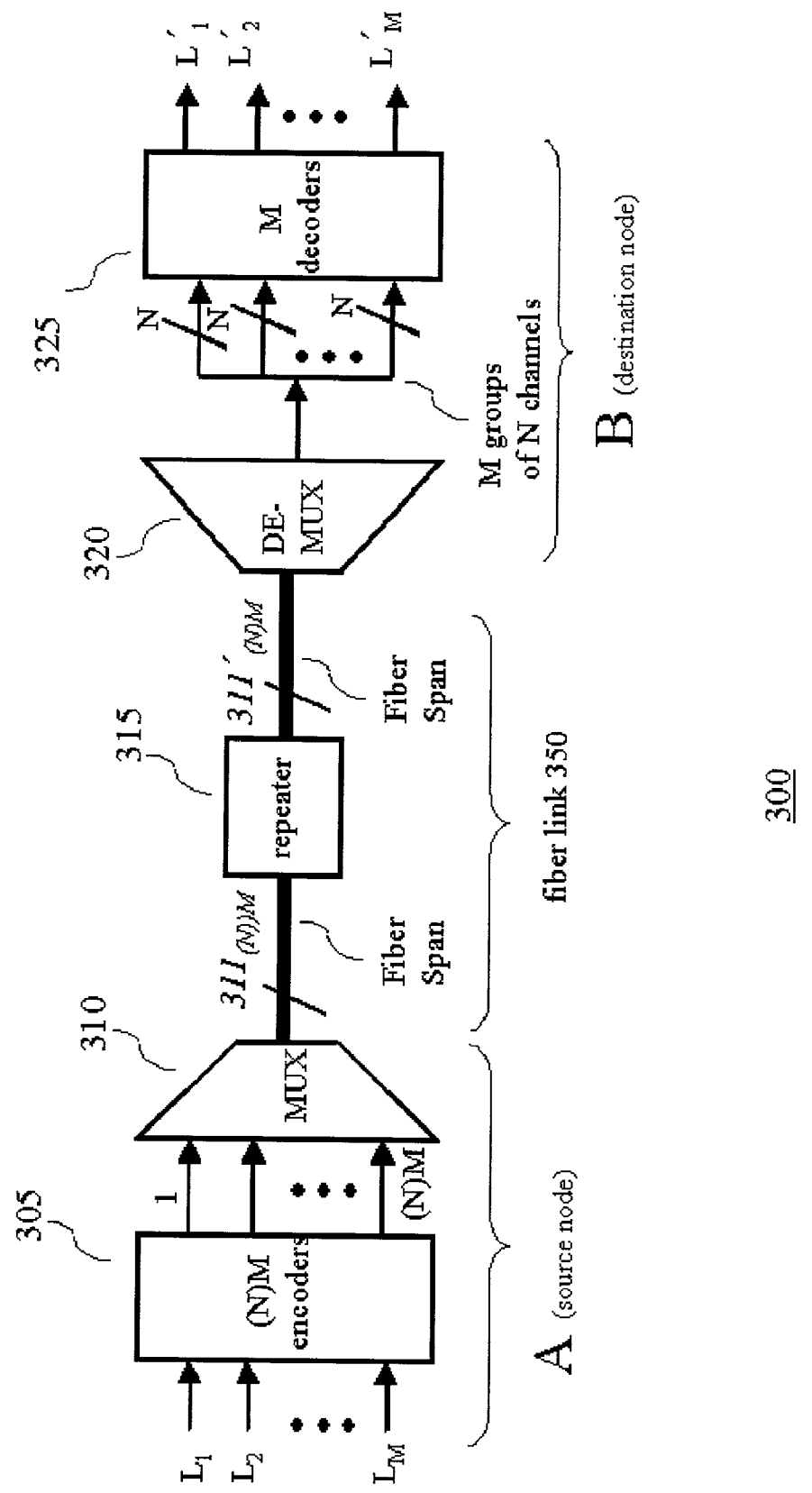
FIGS. 3–5 show other embodiments in accordance with the principles of the invention.
Figure 4:
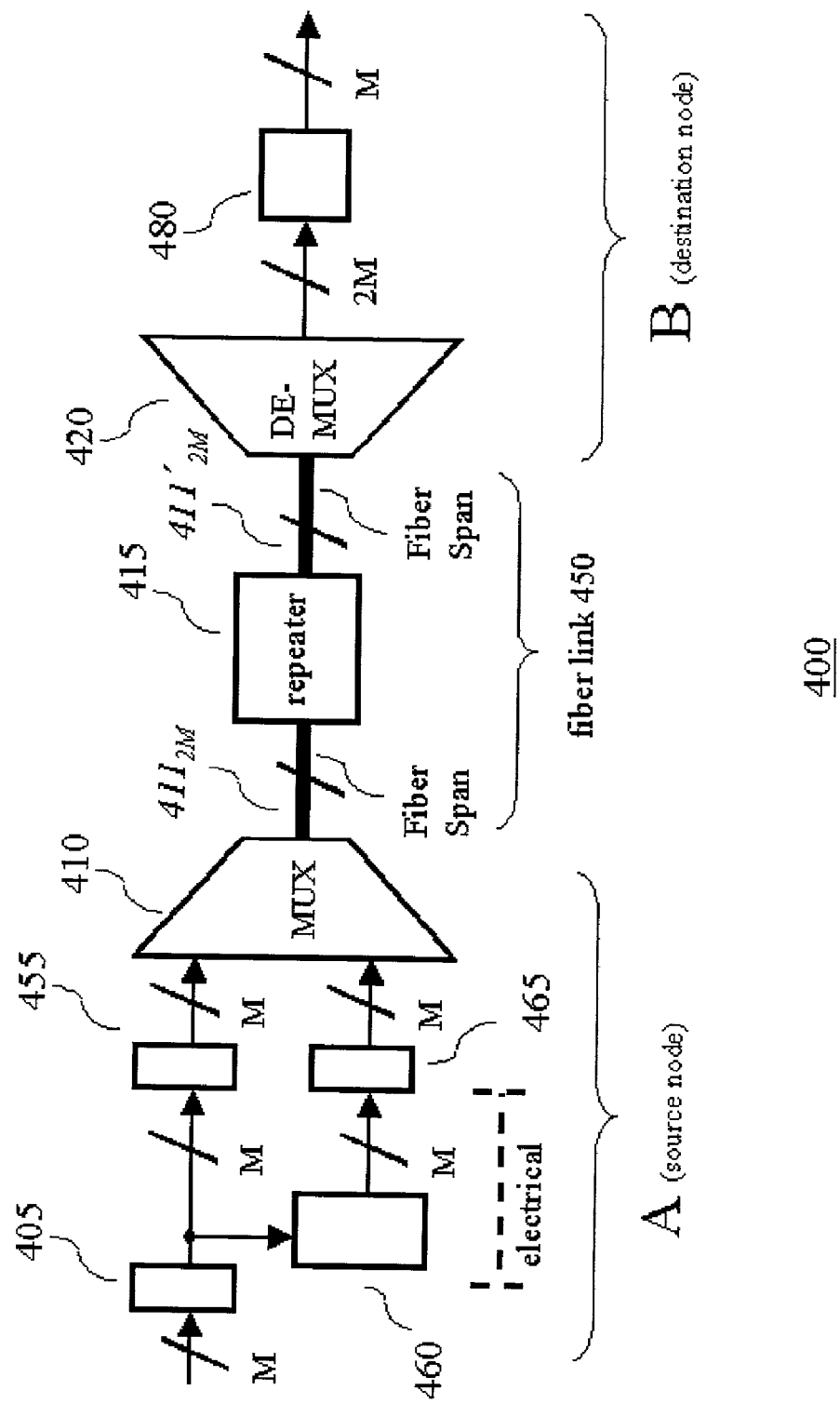
Figure 5:
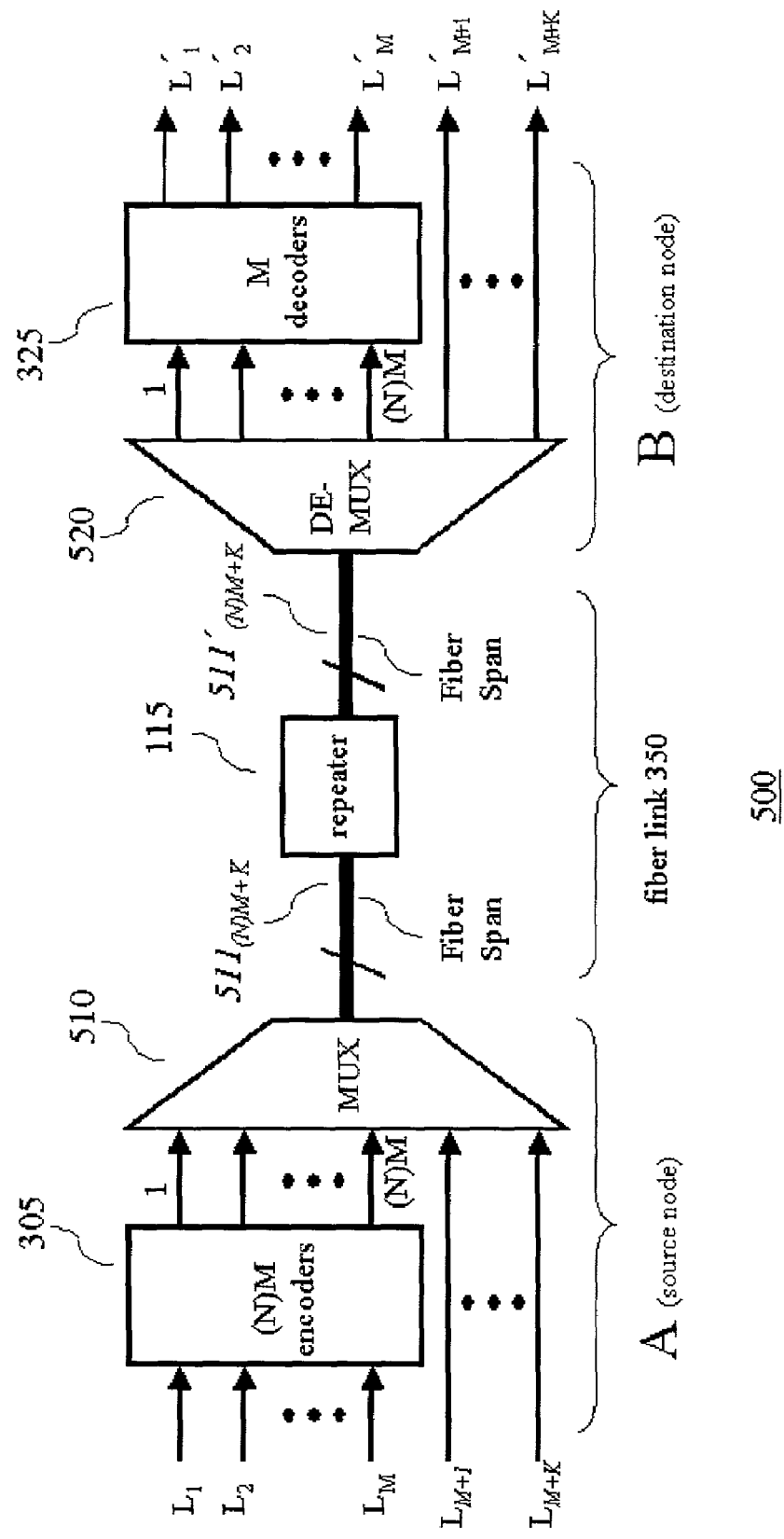

Other variations of the invention are shown in FIGS. 3–5. A portion of an illustrative communications system, 300, in accordance with the principles of the invention is shown in FIG. 3. Other than the inventive concept, the elements shown in FIG. 3 are well-known and will not be described in detail. For example, mux 310 is a dense wavelength division multiplexer, and de-mux 320 is a dense wavelength division demultiplexer, as known in the art. In addition, although shown as single block elements, some or all of these elements may be implemented using stored-program-control processors, memory, and/or appropriate interface cards (not shown).

Portion 300 comprises a source node A and a destination node (or sink node) B coupled via fiber link 350. The latter comprises fiber spans (e.g., optical fiber cabling) and a representative repeater 315 (i.e., there may be more than one). (It should be noted that a repeater is not required for the inventive concept and is shown in FIG. 3 merely for completeness.) Source node A receives M optical signals as represented by $L_1, L_2, \ldots L_M$. Each optical signal conveys a different information stream at a different wavelength. (It should be noted that although shown as separate optical signals, an equivalent representation of the signals applied to source node A is a single wavelength division multiplexed (WDM) optical signal comprising M channels. In this case, either a demultiplexer (not shown) is added to source node A to separate out the M channels or is assumed a part of (N)(M) encoders 305.) In accordance with the inventive concept, source node A multiply encodes the information received from each of the M optical channels onto N optical channels, where N is greater than or equal to 2, via (N)(M) encoders 305. The resulting (N)(M) optical channels are applied to multiplexer (mux) 310, which provides an optical WDM signal $311_N$ comprising (N)(M) wavelengths (channels) to fiber link 350. It should be noted that optical WDM signal $311_N$ is viewed as comprising M groups of optical signals, each group comprising N channels. Optical WDM signal $311_N$ transits fiber link 350, which via repeater 315—amplifies/regenerates the signal (as represented by optical WDM signal 311'). Fiber link 350 provides optical WDM signal 311' to destination node B. The latter performs a complementary function to source node A to recover the original optical WDM signal comprising M channels. In particular, the received optical WDM signal, 311', is demultiplexed into (N)(M) separate channels via demultiplexer (de-mux) 320. These (N)(M) separate channels are applied to M decoders 325 in M groups of N channels. M decoders 325 decodes the information from each of the N groups back into a corresponding one of the M channels as represented by output optical signals $L_1'$, $L_2'$, ... $L_M'$, (As noted above, although shown as separate optical signals, an equivalent representation of the signals provided by destination node B is a single WDM optical signal comprising M channels. In this case, destination node B would further include a multiplexer (not shown) to form the optical WDM signal comprising M channels either as a part of M decoders 325 or a separate element.) It should be noted that the multiple encoders for encoding each of the received M optical signals onto N different channels could all be different, or the same, or combinations thereof. As such, the multiple decoders comprise complementary functions for decoding the signal. For example, assume that a given input signal is identically encoded onto N different channels. Upon reception, the corresponding N decoders reproduce the original input optical signal using, e.g., a simple majority decision process (e.g., if more than half of the N decoded signals indicate a ONE, than assume a ONE was received).

Another illustrative embodiment is shown in FIG. 4, which is similar to FIG. 3, showing source node A coupled to destination B via fiber link 450. Like FIG. 3, other than the inventive concept, the elements shown in FIG. 4 are well known and will not be described in detail. For simplicity, similar components between FIGS. 3 and 4 are not described again, e.g., fiber link 350 and fiber link 450. As shown in FIG. 4, source node A comprises optical-to-electrical converters 405, electrical-to-optical converters 455, inverters 465, electrical-to-optical converters 465 and multiplexer (mux) 410. Apparatus 400 receives M optical signals (each conveying information via the use of intensity modulation), which are applied to optical-to-electrical converters 405, which convert the M optical signals into the electrical domain. The electrical form of each of the M signals is applied to (a) inverters 465, which inverts each of the M signals, and (b) optical-to-electrical converters 455 for conversion back into the optical domain (obviously, the conversion from the optical domain to the electrical domain and back again for the M signals along this path could be eliminated entirely). Inverters 465 provides M inverted signals to electrical-to-optical converters 465, which provides M inverted forms of the M optical signals (M inverted optical signals). Mux 410 multiplexes the M optical signals and the M inverted optical signals to provide optical WDM signal $411_N$, which comprises 2M channels, for transmission on fiber link 450. At the other end of fiber link 450, de-mux 420, of destination node B, receives optical WDM signal $411'_N$ (after amplification/regeneration, if any) and provides M pairs of optical signals to differential detectors 480, which provide M optical signals.

Other variations of the invention are possible, for example, a system can be designed with some wavelengths not using the above-described operation. In this case, M signals are processed in accordance with the inventive concept to create (N)(M) optical channels and K signals are not processed in accordance with the invention. As illustration, one example of such a modification is performed on the apparatus shown in FIG. 3, and which is illustrated in FIG. 5. As shown in FIG. 5, K of the signals are processed in a conventional manner, while M of the signals ($L_1$ through $L_M$) are processed in accordance with the invention.

The foregoing merely illustrates the principles of the invention and it will thus be appreciated that those skilled in the art will be able to devise numerous alternative arrangements which, although not explicitly described herein, embody the principles of the invention and are within its spirit and scope. For example, although the inventive concept was described in the context of multiplexers and demultiplexers, the inventive concept is also applicable to other types of filtering devices, optical or otherwise, such as, but not limited to, optical add/drop multiplexers, etc.

The invention claimed is:

1. A method comprising the steps of:
   demultiplexing a signal comprising pairs of wavelength division multiplexed optical signals, each pair comprising a non-inverted optical signal and an associated, separate inverted optical signal;
   comparing a light intensity of each non-inverted signal to a light intensity of its associated inverted signal;
   selecting the signal with the higher intensity; and
   selecting a bit associated with the higher intensity as a received bit.

2. The method as in claim 1 wherein the bit comprises a binary 1 or 0.

3. The method as in claim 1, further comprising:
   generating the wavelength division multiplexed optical signal comprising the pairs of optical signals.

4. A system comprising a receiver operable to:
   demultiplex a signal comprising pairs of wavelength division multiplexed optical signals, each pair comprising a non-inverted optical signal and an associated, separate inverted optical signal;
   compare a light intensity of each non-inverted signal to a light intensity of its associated inverted signal;
   select the signal with the higher intensity;
   select a bit associated with higher intensity as a received bit.

5. The system as in claim 4 wherein the bit comprises a binary 1 or 0.

6. The system as in claim 4, further comprising a transmitter operable to:
   generate the wavelength division multiplexed optical signal comprising the pairs of optical signals.

* * * * *